Aug. 16, 1966     H. J. WITKOWSKI     3,266,229
FILTER FOR BREATHER PIPE OR THE LIKE
Filed April 22, 1963
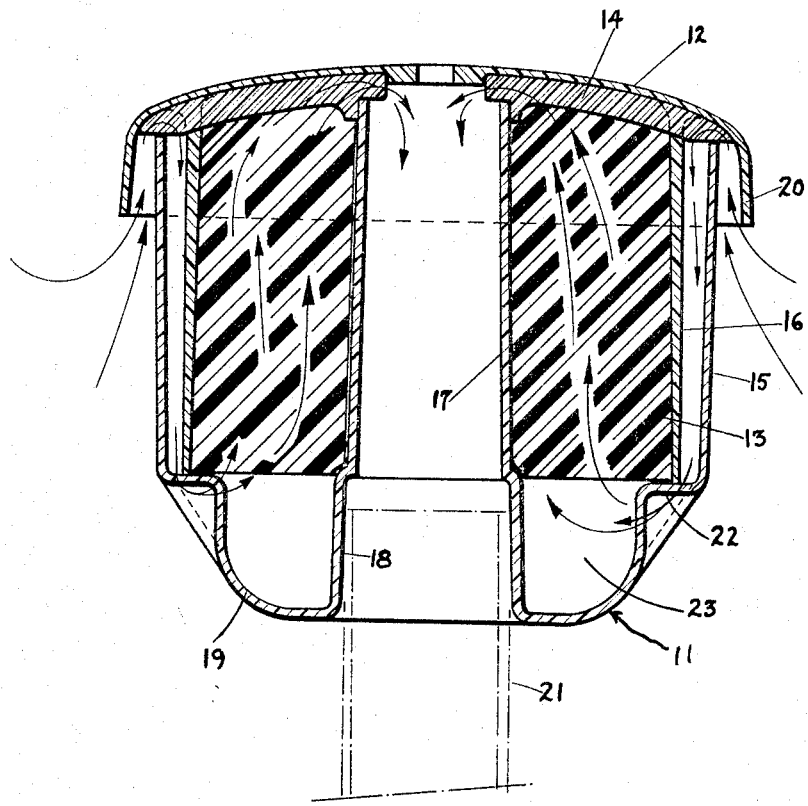
INVENTOR.
HENRY J. WITKOWSKI
BY
Charles L. Lovercheck
Attorney 27
United States Patent Office 3,266,229
Patented August 16, 1966

3,266,229
FILTER FOR BREATHER PIPE OR THE LIKE
Henry J. Witkowski, 561 E. 18th St., Erie, Pa.
Filed Apr. 22, 1963, Ser. No. 274,588
1 Claim. (Cl. 55—505)

This invention relates to filters and, more particularly, to filters for use on automobile carburetors, oil cap inlets, and the like.

Previous filters have been made with various types of filtering media and structural arrangements.

The present invention discloses a filter which has a body integrally molded from a plastic material and has a separable cover which, when in place, provides space for the filter material media therebetween.

It is, accordingly, an object of the present invention to provide an improved filter.

Another object of the invention is to provide an improved filter using foam plastic as a filter media.

A further object of the invention is to provide a filter which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

The figure of drawing is a longitudinal cross sectional view of a filter according to the invention.

Now with more particular reference to the drawing, a filter is shown having a body 11 with a cover 12 and a cylindrical liner 13 of filter material. The cover 12 has radially spaced ribs 14 which rest on the rim of side walls 15.

The body 11 of the filter has the outer side walls 15 which are generally cylindrical in shape and which extend downwardly to a bottom 19 which is in the form of a rounded base which then extends upwardly around a counterbore 18 and through the cylindrical center opening which is defined by a center wall 17.

The cover 12 has a top portion which extends over the rim of the side wall of the filter and is integrally attached to and terminates in a flange 20. The top has the radially spaced ribs 14 which rest at their outer edges on the outer wall 15 and at their inner edges on the center wall 17. These ribs have a shoulder portion which rests against the upper end of the center wall 17.

The cover 12 has a cylindrical inner wall 16 which is generally concentric to the flange 20 and which extends down into the body 11 and rests on spaced lugs 22. The spaced lugs 22 form shoulders. They are formed by the material forming the side wall being molded inwardly at this point.

A breather pipe 21 shown in phantom lines may be received in the counterbore 18 and its upper end can rest against the shoulder formed by the upper end of the counterbore.

The filter liner 13 is made of a porous plastic material in the form of a hollow cylinder which fits snugly between the center wall 17 and the inner wall 16 of the filter.

Air entering under the flange 20 flows up between the outer ends of the ribs 14, then down between the annular space defined by the outer walls 15 and the inner wall 16 to the space between the lugs 22. Then it flows through a space 23 at the bottom of the filter and up through the liner 13 in the direction shown by the arrows and thence between the ribs 14 to the inside of the inner wall 16. Thus, air entering through this path will be filtered and foreign objects will be left in the filter media. The ribs 14 engage the outer surface of the center wall and locate the cover 12.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

An air filter comprising
a hollow integral body made of a molded plastic material and having a generally cylindrical outer wall,
a generally cylindrical center wall,
and a bottom,
said walls being secured together and defining an annular space therein having one open end,
said center wall having an open ended center space therein,
said outer wall being molded inwardly adjacent the bottom to form a plurality of circumferentially spaced apart lug members extending radially inwardly in said annular space toward and terminating short of said center wall and forming substantially flat shoulders facing the open end of said annular space,
a removable cover for said filter having a downwardly extending, generally cylindrical wall portion slightly less in size than said outer wall,
and a downwardly extending flange slightly greater in size than said outer wall and spaced apart therefrom,
said wall portion on said cover resting at its lower end on said shoulders of said lug members and defining a space between said cover wall portion and said center wall, and a space between said cover wall portion and said outer wall,
a hollow cylindrical filter member made of foam plastic material having air passages therethrough filling the space between said cover wall portion and said center wall and having a portion of its lower end resting on said shoulders of said lug members and being supported thereby,
said body having a counterbore in its bottom and having the end of a breather member tightly received in said counterbore,
said cover having circumferentially spaced apart, radially extending ribs resting on said center wall and said outer wall and spacing said cover from said walls,
said ribs having spaced lugs thereon engaging the outer surface of said center wall to locate said cover,
the entire lower end and the entire upper end of said foam material being unobstructed except for said shoulders and said ribs whereby air from said annular space may enter the lower end of said foam material and escape through the upper end of said foam material.

References Cited by the Examiner

UNITED STATES PATENTS

| | | |
|---|---|---|
| 2,046,093 | 6/1936 | Schaaf et al. |
| 2,354,481 | 7/1944 | Russell ---------- 210—451 X |
| 2,514,543 | 7/1950 | Hamman ------------ 55—246 |
| 2,718,277 | 9/1955 | Hamman ------------ 55—510 |
| 2,904,129 | 9/1959 | McMichael ---------- 55—276 |
| 2,920,717 | 1/1960 | Tuttle et al. ------- 55—510 X |

FOREIGN PATENTS 129,232   9/1948   Australia.

ROBERT F. BURNETT, *Primary Examiner.*